United States Patent
Wood et al.

(10) Patent No.: US 12,238,455 B2
(45) Date of Patent: *Feb. 25, 2025

(54) METHOD AND APPARATUS FOR INITIATING AND MANAGING CHAT SESSIONS

(71) Applicant: Apple Inc., Cupertino, CA (US)

(72) Inventors: Justin Wood, Sunnyvale, CA (US); Peter Westen, Mountain View, CA (US); Pierre De Filippis, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 571 days.

This patent is subject to a terminal disclaimer.

(21) Appl. No.: 16/896,095

(22) Filed: Jun. 8, 2020

(65) Prior Publication Data

US 2020/0374489 A1    Nov. 26, 2020

Related U.S. Application Data

(63) Continuation of application No. 16/173,960, filed on Oct. 29, 2018, now Pat. No. 10,681,307, which is a continuation of application No. 14/492,719, filed on Sep. 22, 2014, now Pat. No. 10,116,900, which is a continuation of application No. 12/549,798, filed on Aug. 28, 2009, now Pat. No. 8,843,834.

(51) Int. Cl.
| | |
|---|---|
| *G06F 3/048* | (2013.01) |
| *G06Q 10/107* | (2023.01) |
| *H04L 12/18* | (2006.01) |
| *H04N 7/15* | (2006.01) |

(52) U.S. Cl.
CPC .............. *H04N 7/15* (2013.01); *G06Q 10/107* (2013.01); *H04L 12/1827* (2013.01)

(58) Field of Classification Search
None
See application file for complete search history.

(56) References Cited

U.S. PATENT DOCUMENTS

| | | | | |
|---|---|---|---|---|
| 6,463,078 B1 * | 10/2002 | Engstrom | ............... | H04L 67/12 |
| | | | | 370/466 |
| 6,549,937 B1 * | 4/2003 | Auerbach | ................. | H04L 9/40 |
| | | | | 709/206 |
| 6,941,345 B1 * | 9/2005 | Kapil | ...................... | H04L 67/14 |
| | | | | 709/228 |
| 7,076,730 B1 * | 7/2006 | Baker | ....................... | G06F 9/44 |
| | | | | 715/752 |

(Continued)

OTHER PUBLICATIONS

U.S. Appl. No. 12/549,798, Examiner Interview Summary mailed Apr. 21, 2014, 3 pgs.

(Continued)

*Primary Examiner* — Hua Lu
(74) *Attorney, Agent, or Firm* — Fletcher Yoder P.C.

(57) ABSTRACT

During a communication session facilitated by a first communication service between a first device and a second device, a processor may receive a request to execute a feature not supported by the first communication service. The processor may also identify a second communication service that does support the feature. Further, the processor may then cause the communication session to transition from the first communication service to the second communication service.

20 Claims, 10 Drawing Sheets

(56) References Cited

U.S. PATENT DOCUMENTS

| | | | |
|---|---|---|---|
| 7,499,969 B1 | 3/2009 | Van Os et al. | |
| 7,792,912 B2 | 9/2010 | Britton et al. | |
| 8,595,290 B2* | 11/2013 | Weinryb | H04L 51/52 |
| | | | 709/204 |
| 8,843,834 B2 | 9/2014 | Wood et al. | |
| 9,225,537 B1* | 12/2015 | Hendricks | H04L 67/54 |
| 2002/0076025 A1* | 6/2002 | Liversidge | H04L 51/04 |
| | | | 709/204 |
| 2002/0118809 A1* | 8/2002 | Eisenberg | H04L 12/1813 |
| | | | 379/202.01 |
| 2003/0023508 A1* | 1/2003 | Deep | G06Q 30/06 |
| | | | 705/26.1 |
| 2003/0032409 A1 | 2/2003 | Hutcheson et al. | |
| 2003/0105812 A1* | 6/2003 | Flowers, Jr. | H04L 63/029 |
| | | | 709/203 |
| 2003/0185232 A1* | 10/2003 | Moore | H04L 51/00 |
| | | | 704/E15.045 |
| 2004/0017396 A1* | 1/2004 | Werndorfer | H04L 51/04 |
| | | | 715/751 |
| 2004/0048612 A1* | 3/2004 | Virtanen | H04W 76/20 |
| | | | 455/435.2 |
| 2004/0054737 A1* | 3/2004 | Daniell | H04L 12/1831 |
| | | | 709/206 |
| 2004/0078612 A1 | 4/2004 | Kanapathippillai et al. | |
| 2004/0119760 A1 | 6/2004 | Grossman et al. | |
| 2004/0172452 A1* | 9/2004 | Erickson | H04L 67/63 |
| | | | 709/206 |
| 2004/0174392 A1* | 9/2004 | Bjoernsen | G06Q 10/10 |
| | | | 715/751 |
| 2004/0199580 A1* | 10/2004 | Zhakov | H04M 3/563 |
| | | | 709/204 |
| 2004/0239754 A1* | 12/2004 | Shachar | H04L 12/1818 |
| | | | 379/202.01 |
| 2004/0242191 A1 | 12/2004 | Hossain et al. | |
| 2005/0078612 A1* | 4/2005 | Lang | H04L 12/1818 |
| | | | 370/260 |
| 2005/0091364 A1* | 4/2005 | Bantz | H04L 67/1008 |
| | | | 709/224 |
| 2005/0181878 A1* | 8/2005 | Danieli | G07F 17/3276 |
| | | | 463/42 |
| 2005/0238156 A1* | 10/2005 | Turner | H04M 3/567 |
| | | | 709/204 |
| 2006/0004911 A1* | 1/2006 | Becker | G06Q 10/107 |
| | | | 709/207 |
| 2006/0020676 A1* | 1/2006 | Peterson | H04L 12/1813 |
| | | | 709/207 |
| 2006/0023695 A1* | 2/2006 | Yarlagadda | H04M 3/4931 |
| | | | 370/352 |
| 2006/0025091 A1* | 2/2006 | Buford | H04L 51/063 |
| | | | 455/154.2 |
| 2006/0128305 A1 | 6/2006 | Delalat | |
| 2006/0190543 A1* | 8/2006 | Pulver | H04L 51/04 |
| | | | 709/206 |
| 2007/0037599 A1* | 2/2007 | Tillet | H04L 12/1813 |
| | | | 455/521 |
| 2007/0061405 A1* | 3/2007 | Keohane | G06Q 10/109 |
| | | | 709/207 |
| 2007/0127374 A1* | 6/2007 | Black | H04N 21/41407 |
| | | | 370/296 |
| 2007/0147369 A1* | 6/2007 | Binder | H04L 12/6418 |
| | | | 370/389 |
| 2007/0156910 A1 | 7/2007 | Christie et al. | |
| 2007/0271139 A1 | 11/2007 | Fiorini | |
| 2007/0288560 A1* | 12/2007 | Bou-Ghannam | G06Q 10/107 |
| | | | 709/204 |
| 2008/0040433 A1 | 2/2008 | Glasgow | |
| 2008/0104173 A1 | 5/2008 | Wilcox et al. | |
| 2008/0114835 A1 | 5/2008 | Mu et al. | |
| 2008/0133580 A1* | 6/2008 | Wanless | H04L 61/4594 |
| | | | 707/999.102 |
| 2008/0146258 A1 | 6/2008 | Testone et al. | |
| 2008/0162633 A1 | 7/2008 | Scherpa et al. | |
| 2008/0177659 A1 | 7/2008 | Lacey et al. | |
| 2008/0178096 A1 | 7/2008 | Kusuda | |
| 2008/0189293 A1* | 8/2008 | Strandel | G06Q 10/107 |
| 2008/0195727 A1* | 8/2008 | Diomelli | H04M 1/2535 |
| | | | 709/224 |
| 2008/0198141 A1* | 8/2008 | Lee | G06F 3/04883 |
| | | | 345/173 |
| 2008/0228894 A1 | 9/2008 | Chen et al. | |
| 2008/0229215 A1* | 9/2008 | Baron | G06N 3/006 |
| | | | 715/751 |
| 2008/0261569 A1* | 10/2008 | Britt | G06Q 10/107 |
| | | | 455/566 |
| 2008/0298566 A1 | 12/2008 | Scott et al. | |
| 2008/0307324 A1 | 12/2008 | Westen et al. | |
| 2009/0016510 A1 | 1/2009 | Becker et al. | |
| 2009/0089683 A1* | 4/2009 | Thapa | H04L 65/1089 |
| | | | 715/756 |
| 2009/0092234 A1 | 4/2009 | St. Onge et al. | |
| 2009/0170480 A1 | 7/2009 | Lee | |
| 2009/0178062 A1 | 7/2009 | Westen | |
| 2009/0186638 A1* | 7/2009 | Yim | H04L 65/1104 |
| | | | 709/206 |
| 2009/0193092 A1 | 7/2009 | Li | |
| 2009/0228944 A1* | 9/2009 | Bodlaender | H04L 12/1827 |
| | | | 725/110 |
| 2009/0307319 A1* | 12/2009 | Dholakia | H04L 12/1822 |
| | | | 709/206 |
| 2010/0037151 A1* | 2/2010 | Ackerman | G06Q 10/10 |
| | | | 715/753 |
| 2010/0098063 A1* | 4/2010 | Croak | H04L 12/66 |
| | | | 370/352 |
| 2010/0174789 A1* | 7/2010 | Pena | H04L 67/02 |
| | | | 709/206 |
| 2010/0220635 A1* | 9/2010 | Gisby | H04L 12/1822 |
| | | | 370/260 |
| 2010/0251142 A1* | 9/2010 | Geppert | H04W 4/21 |
| | | | 715/758 |
| 2010/0251177 A1* | 9/2010 | Geppert | H04M 3/563 |
| | | | 709/206 |
| 2011/0055735 A1 | 3/2011 | Wood et al. | |

OTHER PUBLICATIONS

U.S. Appl. No. 12/549,798, Final Office Action mailed Aug. 28, 2012, 18 pgs.

U.S. Appl. No. 12/549,798, Non Final Office Action mailed Jan. 6, 2014; 19 pgs.

U.S. Appl. No. 12/549,798, Non Final Office Action mailed Jan. 31, 2012; 24 pgs.

U.S. Appl. No. 12/549,798, Notice of Allowance mailed May 15, 2014; 8 pgs.

U.S. Appl. No. 12/549,798, Response filed Jan. 16, 2013 to Final Office Action mailed Aug. 28, 2012; 13 pgs.

U.S. Appl. No. 12/549,798, Response filed Apr. 21, 2014 to Non Final Office Action mailed Jan. 16, 2014; 14 pgs.

U.S. Appl. No. 12/549,798, Response filed Apr. 30, 2012 to Non Final Office Action mailed Jan. 31, 2012; 14 pgs.

* cited by examiner

METHOD AND APPARATUS FOR INITIATING AND MANAGING CHAT SESSIONS

CROSS-REFERENCE TO RELATED APPLICATIONS

This application is a continuation of U.S. application Ser. No. 16/173,960 filed Oct. 29, 2018, entitled "METHOD AND APPARATUS FOR INITIATING AND MANAGING CHAT SESSIONS," which is a continuation of U.S. application Ser. No. 14/492,719, filed Sep. 22, 2014, entitled "METHOD AND APPARATUS FOR INITIATING AND MANAGING CHAT SESSIONS," which is a continuation of U.S. application Ser. No. 12/549,798, filed on Aug. 28, 2009, entitled "METHOD AND APPARATUS FOR INITIATING AND MANAGING CHAT SESSIONS," all of which are incorporated herein by reference in their entireties.

FIELD OF THE INVENTION

The present invention relates generally to communications. More particularly, this invention relates to chat systems.

BACKGROUND

A variety of communication methods by the use of computer networks have been developed in recent years in accordance with the growth of the Internet. Such methods include chat systems, multi-user and real-time communication methods. Chat systems have widely replaced traditional telephones and electronic mail. A chat system is a means through which typed conversation is sent from a sender to a recipient via a computer network, namely the Internet, almost instantly.

A client computer may be linked to a network through a server computer. Such a client computer running a software application allowing one user to chat with another user on the same network can be termed a "chat client." "A virtual space" may be defined as the chat network created by the users chatting via chat clients and matching servers (also referred to as chat servers). A conversation forum, or channel, is created between the users chatting via the chat clients. Thus, a "chat system" is a communication method characterized by chat users who share numerous virtual spaces.

A chat user is identified by a user-selected chat service name. A chat user may chat by multiple chat services and therefore can have multiple service names, each representing an account (e.g., chat service account) associated with a chat server. A user may have multiple chat services that are associated with the same chat server (e.g., a mobile account and a non-mobile account). Unfortunately, when a user wishes to send a chat message to another user having multiple chat services, the sender must determine which chat service to use to send the message, and/or determine which chat service the receiver is logged into. In addition, certain types of chats (e.g., video chat) require both sender's device and receiver's device to have certain capabilities (e.g., camera). As a result, when a sender initiates such a chat, the sender must determine and select a receiver's chat service that supports such a capability.

SUMMARY OF THE DESCRIPTION

Method and apparatus for initiating and managing a chat session are described herein. According to one aspect of the invention, user activities with respect to the data processing system are monitored, including user activities that are unrelated to chat services. In response to a request to initiate a chat session between a local user and a remote user, a first chat service account is selected from a list of chat service accounts associated with the remote user based on the monitored user activities. A chat session is initiated using the selected first chat service account of the remote user and a second chat service account selected for the local user. Certain information is displayed within a chat window indicating that the chat session is conducted between the first and second chat service accounts.

According to another aspect of the invention, in response to a request to add a remote user to a chat room by selecting a first chat service account of the remote user, it is determined whether the first chat service account is compatible with a chat service provider hosting the chat room. If the first chat service account is incompatible with the chat service provider, a second chat service account is automatically selected from a list of a plurality of chat service accounts associated with the remote user. An invitation is then sent to the remote user via the second chat service account to invite the remote user to participate in the chat room. Thereafter, an identifier of the second chat service account is displayed within a chat window associated with the chat room.

According to another aspect of the invention, a chat session is initiated between a local user and a remote user, where each of the local user and the remote user has multiple chat service accounts associated with one or more chat service providers. In response to a request to enable a predetermined chat feature within the chat session that is not supported by at least one chat service account used to initiate the chat session, an alternative chat service account is automatically selected from the multiple chat service accounts associated with the same owner of the at least one chat service account that does not support the predetermined feature. The chat session is transitioned to be used with the selected alternative chat service account and the predetermined feature is enabled within the chat session.

According to another aspect of the invention, in response to request for starting a group video chat among a plurality of members, it is determined whether each member has a chat service account under the same chat service provider that supports the group video chat. Multiple group video chats are initiated among the members if not all members have a chat service account under the same chat service provider, where each member has at least one chat service account to participate at least one of the multiple group video chat. After the multiple group video chats started, the multiple group video chats are merged into one group video chat by direct communications among the members without involving a chat server that initiates the multiple group video chats.

According to another aspect of the invention, a request is received from a first host member of a group chat session indicating that the first host member is exiting the group chat session. In response to the request, a negotiation is performed among remaining members of the group chat session to identify and select a second host member to continue hosting the group chat session. The group chat session is transitioned to be hosted by the second host member without terminating the group chat session. Thereafter, information is displayed within a chat window of the group chat session indicating that the group chat session is now hosted by the second host member.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Method and apparatus for initiating and managing chat sessions are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According some embodiments, a chat client is configured to intelligently determine the best chat service among multiple chat services of sender and/or receiver using information collected from non-instant messaging activities, such as, for example, user activities. In addition, the chat client is configured to display the selected chat services for both the sender and the receiver in a graphical user interface (GUI), such that a user can easily find out which services of the local user and the opposing party (e.g., remote user) are being used. Further, when a chat having a particular feature (e.g., video) is initiated, a chat client is configured to automatically select a chat service for both the sender and the receiver that support such a feature (e.g., a sender and receiver equipped with a camera).

According to another aspect, when a user selects a chat service of a contact or buddy to invite the contact into a current chat room, if the selected chat service is incompatible with the current chat room and the contact has another chat service that is compatible with the current chat room, the chat client automatically selects the alternative chat service of the contact to invite the contact to join the current chat room.

Further, when a group video chat is initiated, if not all members have a chat service under the same chat service provider, multiple group video chats may be initiated. Thereafter, multiple group video chats are converged into one by direct communications with the members, for example, using point-to-point communications protocols.

Furthermore, during a group chat session hosted by a host member, when the host member drops out of the group chat, renegotiation among the remaining members is performed to identify and select a new host member to continue hosting the group chat session.

Figure 1:
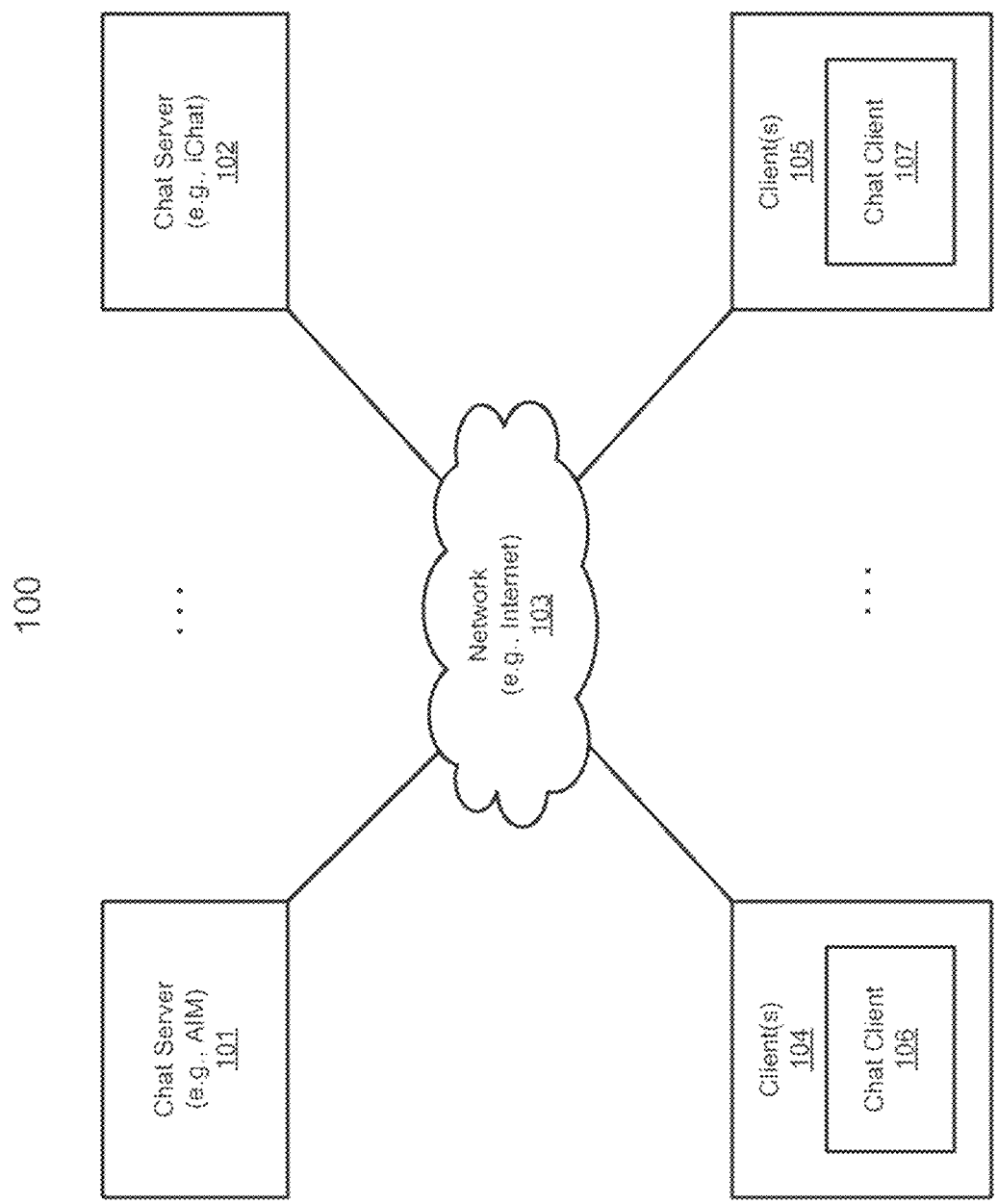
FIG. 1 is a block diagram illustrating a network environment for supporting chat communications according to one embodiment of the invention.

FIG. 1 is a block diagram illustrating a network environment for supporting chat communications according to one embodiment of the invention. Referring to FIG. 1, network environment 100 includes one or more chat servers 101-102 for providing chat services to one or more client systems 104-105 over a network 103. Chat servers 101-102 may be any kind of chat servers that provide instant messaging services, such as, for example, Apple iChat™, AOL instant messenger (AIM), and Microsoft MSN instant messenger, etc. Client systems 104-105 may be any kind of computing devices, such as, for example, laptop or desktop computers, personal digital assistants (PDAs), cellular phones, etc.

Each of the client systems 104-105 includes a chat client application (e.g., chat clients 106-107). A chat client communicates between a client system and a chat server to facilitate chat communications and presence state updates. Additionally, each of client systems 104-105 may include multiple chat clients or multiple instances of a chat client, where each chat client supports chat communications via a different chat service provider (e.g., AIM or iChat). Further, a chat client may be a stand-alone application or may be integrated into an operating system of a client system or into another application executing on the client system, such as a web browser. For example, a chat client may be an iChat™ client application available by Apple Inc. of Cupertino, California.

For example, some of client systems 104-105 can allow users to communicate via voice communications (e.g., telephonic communications and voicemails), e-mails, and SMS (short message service) text messaging. Some communications devices can be loaded with instant messaging applications (also referred to as chat applications), such as iChat™ available by Apple Inc. of Cupertino, California. These applications can allow users to send real-time communications requests (e.g., text, audio, and/or video) to each other.

In facilitating chat communications between client systems, chat servers 101-102 may support chat communications in multiple formats including, but not limited to, chat rooms, instant messaging, IRC, and text messaging via multiple types of media including, but not limited to, text, voice, graphics, video, and file transfer.

In addition, in facilitating chat communications between client systems, chat servers 101-102 may support monitoring the presence state of each user currently logged in through a chat client and distributing the presence state of each user to other users logged in through other chat clients. For example, the presence of the user logged in at client system 104 may be broadcast via one of chat servers 101-102 to client system 105 because the users logged in at these client systems have requested to monitor the presence of the user logged in at client system 104.

According to one embodiment, a chat client is configured to intelligently determine the best chat service among multiple chat services of sender and/or receiver using information collected from non-instant messaging activities, such as, for example, user activities. For example, if a local user just finished a phone call with a mobile phone of a remote user, when a new chat session is initiated with the remote user, the chat client of the local user may send a chat message to the mobile phone of the remote user as an SMS message because most likely the remote user is with the mobile phone. Other events that may be used to infer which account to use includes: most recently logged in, most recently changed user status (e.g., available vs. away, updated status message), or time of day (e.g., use work account between 9:00 am to 5:00 pm).

In addition, the chat client is configured to display the selected chat services for both the sender (e.g., local user or source) and the receiver (e.g., remote user or destination) in a graphical user interface (GUI), such that a user can easily find out which services of the user and the opposing party are being used. That is, the chat client is configured to display not only the chat service for the receiver, but also the sender, such that when there is a change in chat service (either automatically or manually), the user of the chat client would know which chat services are currently used for both parties. This is useful when a chat session is switched from one chat service to another automatically as described below. The displayed information may also include other information, such as, for example, information indicating whether certain feature such as encryption are enabled. Other information with respect to a user can also be shown, such as, for example, recent online activities (e.g., posting photos to an online social network), capabilities such as audio or video chat, file transfer, screen sharing, etc.

Further, when a chat session having a particular feature (e.g., video) is initiated, a chat client is configured to automatically select a chat service for the sender and/or the receiver that support such a feature (e.g., a sender and receiver equipped with a camera). For example, if a local user has a desktop and a laptop, where only the laptop is equipped with a camera, when a video chat is initiated, the chat client may select a chat service (also referred to as a chat service account) associated with the laptop to initiate the chat session since the desktop may not have a camera equipped in this example. Similarly, the chat client may also select a chat service of the remote user that supports the video chat. Such selections may be performed by a chat client automatically without user intervention. In another example, during a non-video chat, if the local user decides to switch to a video chat, the chat client of the local user may automatically select a chat service of the remote user that supports video chat and transition the current chat into a video chat, if the current chat service of the remote user does not support the video chat. In addition, to the services themselves, the client software and/or hardware being used by each user may have to have compatible capabilities. For example, some slower machines and/or software on an older operating system (OS) may not have the capability to do multi-person video chatting. These factors are also considered when selecting a chat service.

According to another embodiment, when a user selects a chat service of a contact or buddy to invite the contact to participate in a current chat room, if the selected chat service is incompatible with the current chat room and the contact has another chat service that is compatible with the current chat room, the chat client automatically selects the alternative chat service of the contact to invite the contact to join the current chat room. For example, during a current chat session associated with AIM, a local user drags and drops a graphical representation such as an icon representing a chat service associated with a remote user into the current chat room. If the selected chat service of the remote user is associated with another chat system such as iChat™ and the remote user also has alternative chat service associated with AIM, the chat client automatically selects the chat service associated with AIM to invite the remote user to join the current chat session. As a result, when a remote user has many chat services, the local user does not have to remember which chat service is compatible with a chat system of a current chat room. The local user can simply drags one of the chat services of the remote user into the current chat room and the chat client will take care of the rest to properly identify a chat service of the remote user for the purpose of inviting the remote user to join the current chat room.

Alternatively, according to an alternative embodiment, a local user can simply drag a graphical representation (e.g., icon) of a remote user into a current chat room. The chat client is configured to intelligently determine and select a chat service account belonging to the remote user that is compatible with the service of the current chat room. That is, this makes the choice of services and accounts generally unnecessary for users. The chat client can indicate what it is doing for informational purposes. As a result, a user will interact with representations of people, rather than representations of people's chat service accounts. However, the default selection by the chat client may be overridden by user's customized settings or preferences.

Further, according to another embodiment, when a group video chat is initiated, if not all members have a chat service under the same chat service provider, multiple group video chats may be initiated. Thereafter, multiple group video chats are merged into one by direct communications with the members, for example, using point-to-point communications protocols. For example, user A wants to start a group video chat session with users B and C. While user A has a chat service under AIM and another chat service under iChat that support group video chat, user B only has a chat service under AIM supporting group video chat and user C only has a chat service under iChat supporting group video chat. Conventionally, this is not possible to start a group video chat since not all of the members have a chat service account under the same chat system. According to one embodiment, in this example, the chat client of user A can start two group chat sessions, one with user B under AIM and another one with user C under iChat. Once both sessions started, the chat client of user A merges both group chat sessions into one session. This is can be done because once the sessions start, the chat servers are no longer needed and the chat clients communicate with each other via point-to-point communications protocols (e.g., using IP addresses and message ports). In one embodiment, after the point-to-point connection has been established, the session initiation protocol (SIP) or remote desktop protocol (RDP) may be utilized among the participants.

Furthermore, during a group chat session hosted by a host member, when the host member drops out of the group chat, typically, the group chat is terminated. According to one embodiment, once the existing host drops out, renegotiation among chat clients of the remaining members is performed to identify and select a new host member to continue hosting the group chat session.

Figure 2:
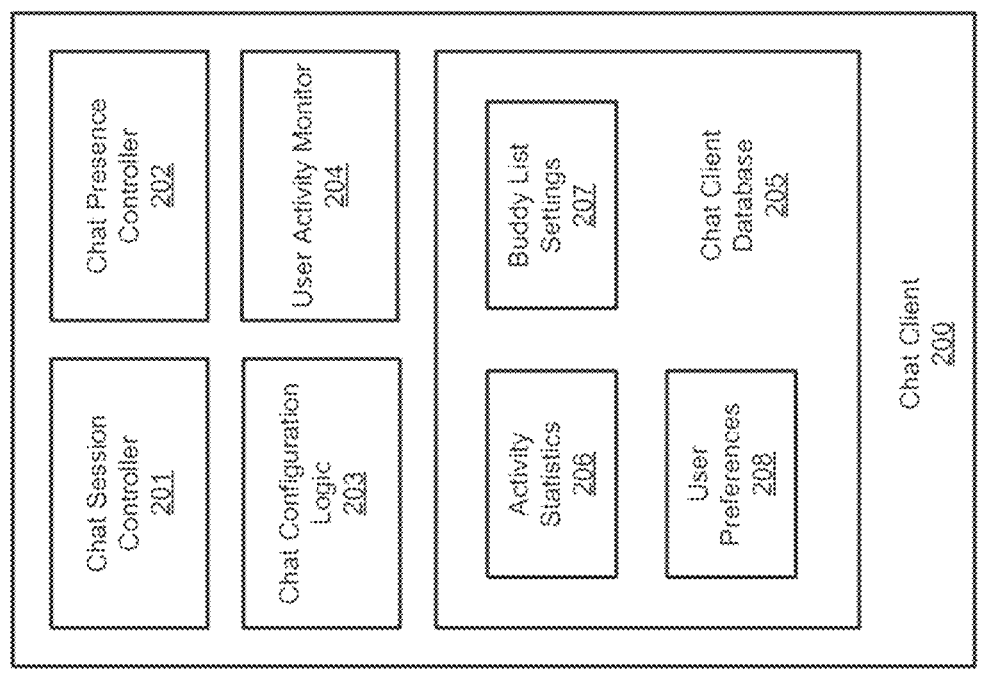
FIG. 2 is a block diagram illustrating a chat client according to one embodiment of the invention.

FIG. 2 is a block diagram illustrating a chat client according to one embodiment of the invention. For example, chat client 200 may be implemented as part of chat clients 106 and/or 107 of FIG. 1. Referring to FIG. 2, chat client 200 includes, but is not limited to, a chat session controller 201, a chat presence controller 202, chat configuration logic 203, a user activity monitor 204, and a chat client database 205 to store a variety of data such as activity statistics 206, buddy list settings 207, and user preferences 208, etc.

Chat sessions controller 201 is configured to enable a local user to select to communicate via a chat session with a remote user who is logged on and receiving chat session requests, and to communicate with another user via a chat session. Additionally, chat sessions controller 201 handles received requests from other users requesting communication with the local user via a chat session (e.g. chat requests). Upon receipt of a request from another user to chat with the local user, chat sessions controller 201 may alert the local user to the chat request.

Chat presence controller 202 may broadcast the presence state for the local user to a chat server (e.g., chat servers 101-102 of FIG. 1) which in turn broadcasts the presence state to other users. In addition, chat presence controller 202 may directly broadcast the presence state for the local user to another chat client. Chat presence controller 202 is configured to enable the local user to select a particular presence state for broadcast to other users. In one embodiment, chat presence controller 202 enables the local user to select a particular presence state by selecting from among multiple indicators of availability. Chat presence controller 202 also controls how the presence states for other users are output to the local user. In one example, the local user adds user identifiers to a buddy list, where the buddy list indicates those users whose presence state the local user automatically requests to monitor. User identifiers added to a buddy list are included in buddy list settings 207. Further, within a buddy list, as stored in buddy list settings 207, the local user may specify groups of users, such as a family group, a business group, a friend group, and other user definable groups.

According to one embodiment, each user in the buddy list settings may be identified by a user name or buddy name and includes multiple chat services for one or more chat systems (e.g., AIM, iChat, MSN instant messenger systems, etc.) In addition, each chat service may further include information indicating whether the corresponding chat service supports certain features such as video chat, etc.

User activity monitor 204 is configured to monitor a variety of activities performed by the local user and the statistics of the user activities may be stored in activity statistics database 206. Such information may be used to infer which of the chat services should be selected to initiate a chat session under certain circumstances. As described above, when a local user initiates a chat session with a remote user and the local user just finished a phone call with the remote user, the chat session may be initiated over an SMS channel because the remote user is most likely with the mobile phone. Such an activity is monitored by the user activity monitor 204 and used by chat session controller 201 to determine a best way to reach a remote user.

Chat configuration logic 203 is configured to allow a local user to customize user preferences 208 and buddy list settings 207. The chat configuration logic 203 may also allow a user to override certain automatic settings performed by chat client 200. Chat session controller 201 is configured to automatically select a chat service of a local user and/or remote user based on a variety of information such as activity statistics 206, buddy list settings 207, and user preferences 208, as set forth above.

For example, when a local user wishes to initiate a chat session with a remote user, the local user may simply select the username of the remote user without having to specifically select a chat service of the remote user. In response to the selection, chat session controller 201 may analyze all of the chat services associated with the remote user and/or the local user, as well as the recent activities of the local user and/or remote user, which may be previously collected and/or computed, and stored in activity statistics 206, buddy list settings 207, and user preferences 208. Based on the analysis, the chat session controller 201 may automatically select one of the chat services that is the "best" chat service at the point in time for both local user and remote user for initiating a chat session. Thereafter, the local user may override the automatic selection by the system and the system may "learn" from the user manual selection to be used for future selections.

Note that components as shown in FIG. 2 are described for the purpose of illustration only; more or fewer components may also be implemented. Also note that some or all of the components as shown in FIG. 2 may be implemented in software, hardware, or a combination of both.

FIGS. 3A-3D are screenshots illustrating an example of a graphical user interface (GUI) of a chat client according to one embodiment of the invention. For example, screenshots as shown in FIGS. 3A-3D may be presented by chat client 200 of FIG. 2. As described above, when a user initiates a chat session with another user, it is person-to-person communications, where a person may have multiple chat service accounts associated with one or more chat service providers (e.g., AIM, iChat, MSN, etc.). The chat client is configured to intelligently determine the best way to reach the destination based on a variety of information set forth above. For example, when a local user wishes to initiate a chat session with a remote user, the local user may simply click or select an icon associated with the remote user.

Figure 3B:
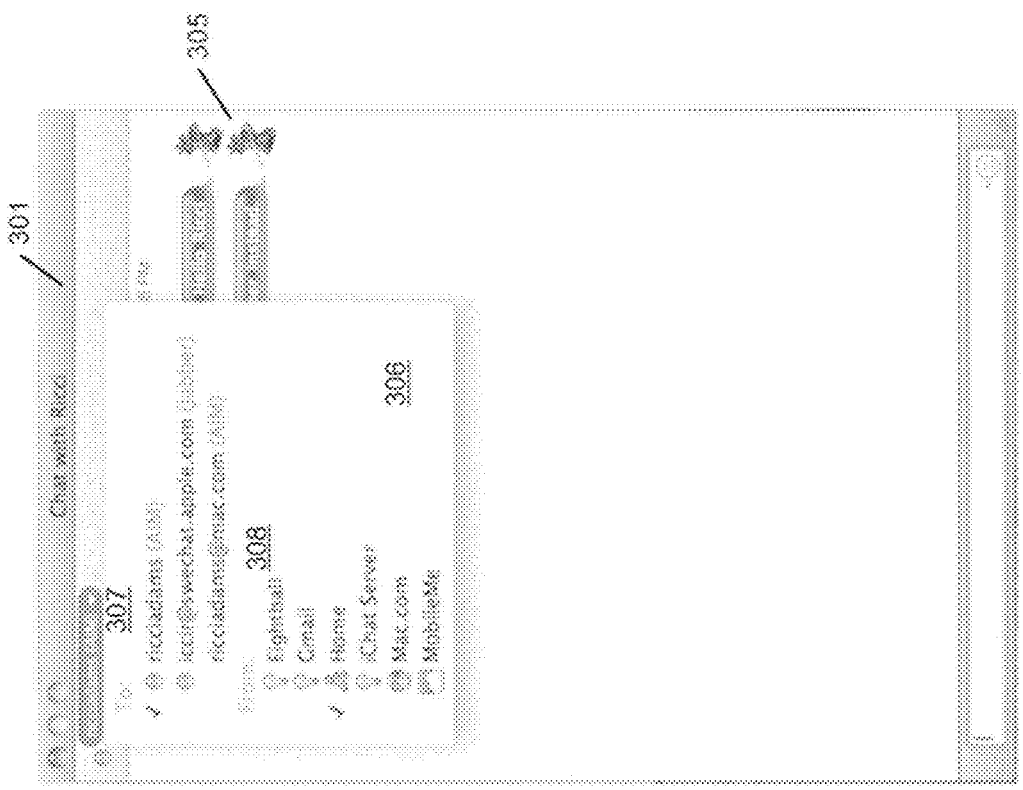
FIGS. 3A-3D are screenshots illustrating an example of a graphical user interface (GUI) of a chat client according to one embodiment of the invention.
Figure 3A:
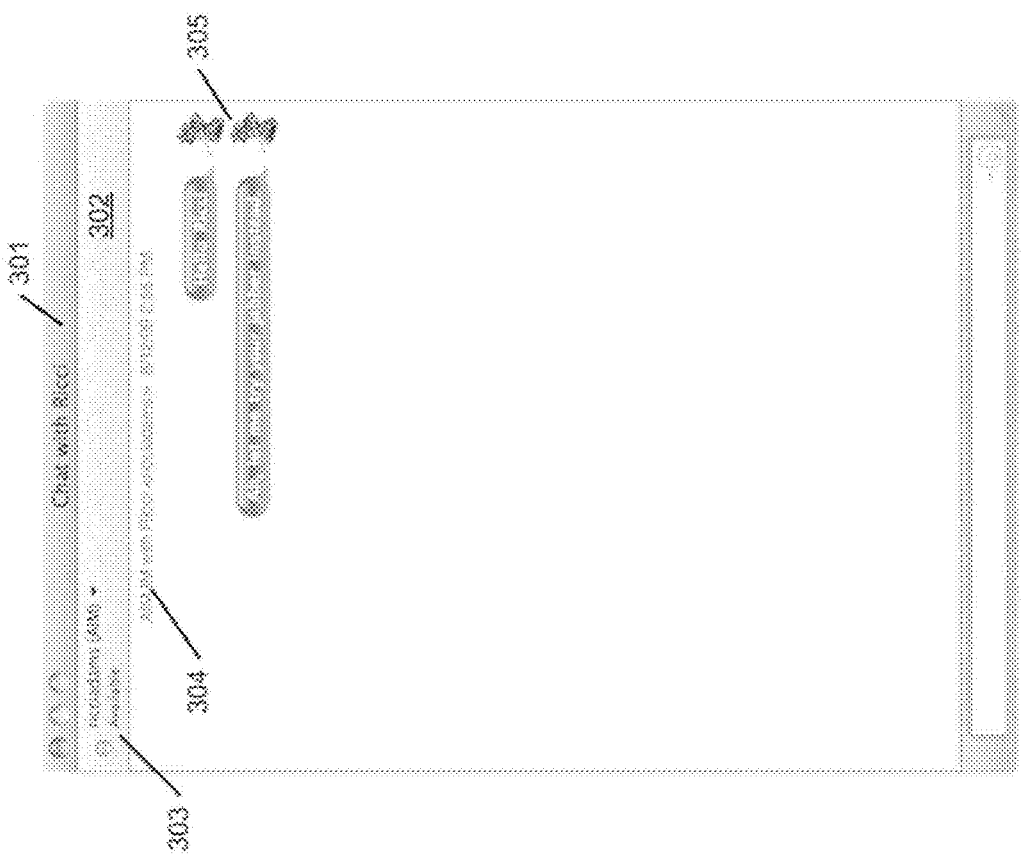

In this example, as shown in FIG. 3A, the local user selects a remote user "Ricci" to initiate a chat session. In this GUI as shown in FIG. 3A, the title bar 301 indicates that a chat session is initiated with a remote user "Ricci" by displaying the username "Ricci" in the title bar 301. In addition, once "Ricci" is selected, the chat client determines the best chat service available for "Ricci." The chat service may be selected based on prior user activities, buddy list settings, and/or user preferences information as described above. For example, the selected chat service may be the one most frequently or recently used by the remote user or the one that the remote user mostly like would accept the invitation. Alternatively, the selected chat service may be the one specifically assigned via the user preference settings. Furthermore, the chat client may determine that the remote user has logged in from home and therefore, a chat service associated with the home desktop computer of the remote user may be automatically selected, instead of a chat service account associated with a mobile device.

In this example, an AIM chat service account "ricciadams" is automatically selected by the chat client. The selected chat service account 303 and its status are displayed in a recipient bar 302. Additional information 304 is also displayed indicating that the current chat session is an AIM instant messenger session between a local users AIM chat service account (e.g., home) and a remote user's chat service account "ricciadams." After sending a couple messages 305 to the remote user, in this example, the local user determines that the remote user may not at the computing device associated with the chat service account "ricciadams."

In this situation, the local user may select another chat service account from a list of available chat service accounts for the remote user in an attempt to reach the remote user. In this example, as shown in FIG. 3B, the local user may display (e.g., by clicking on the currently selected chat service account 303 of the remote user) a menu 306 listing a list of available chat service accounts for both the local user and the remote user. Specifically, menu 306 includes a "To" section 307 and a "From" section 308. The "To" section 307 is used to display a list of chat service accounts of the remote user "Ricci" that are associated with one or more chat service providers, in this example, AIM and Jabber. Similarly, the "From" section 308 is used to display a list of chat service accounts for the local user. In addition, there is an indicator (e.g., check mark) associated with a currently selected chat service for the local user (e.g., "home") and the remote user (e.g., "ricciadams").

Figures 3C, 3D:
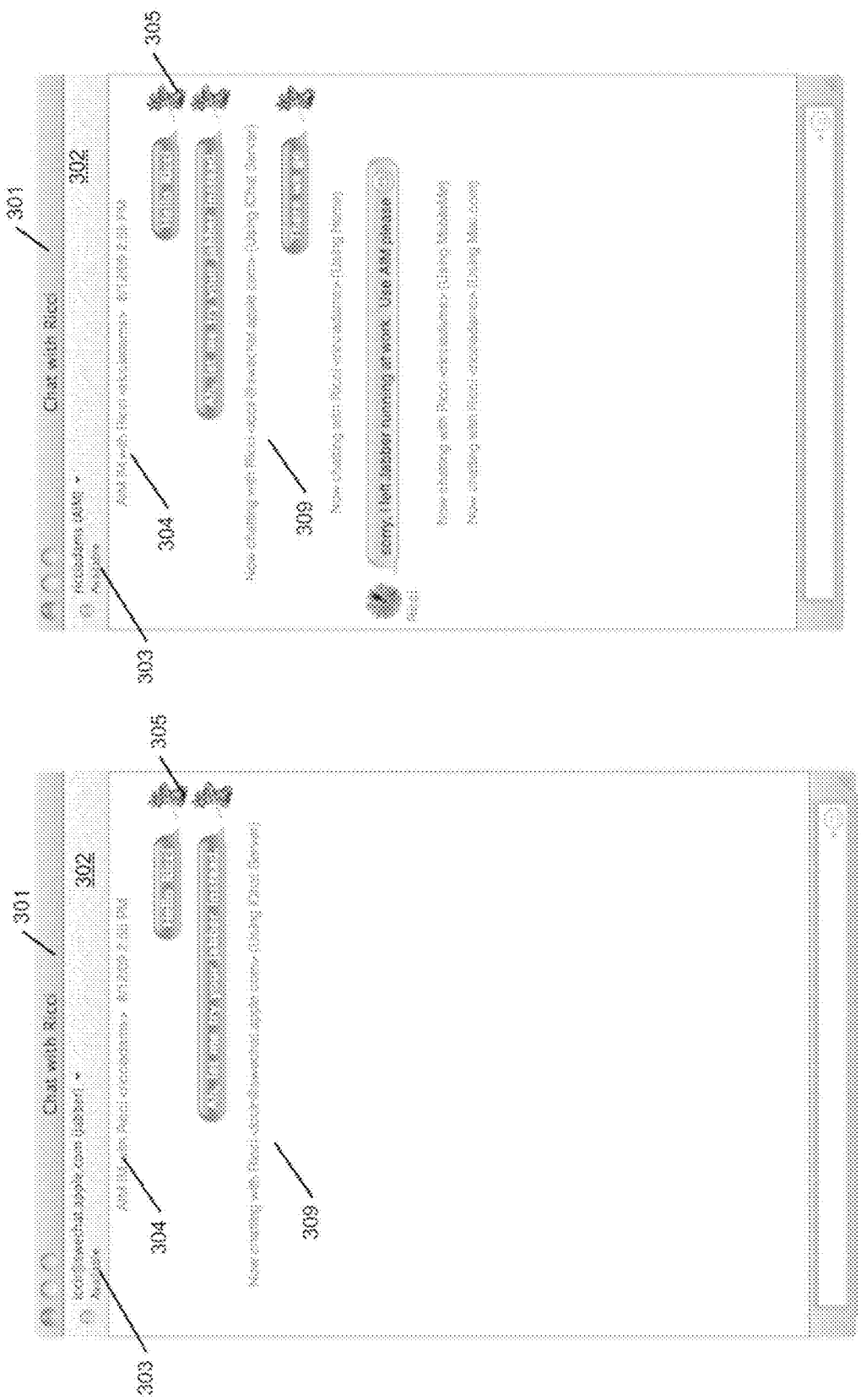

From menu 306, the local user can select an alternative chat service for the local user and/or the remote user. In this example, the local selects an alternative chat service account associated with another chat service provider "Jabber" for the remote user and "iChat" for the local user, as shown in FIG. 3C. Once the new chat service for the remote user has been selected, the recipient bar 302 is updated to reflect the newly selected chat service account. In addition, information 309 is displayed in the chat window indicating that a communication path has been changed with new selected chat service account. The information 309 indicates which of the chat service accounts are currently used for both the local user and the remote user. Similarly, the local user can select other chat service accounts from the list displayed in the "From" section of the menu, and the communications path changes are displayed in the chat window as shown in FIG. 3D. Note that GUIs as shown in FIGS. 3A-3D are described for the illustration purpose only. Other formats of the GUIs may also be applied herein.

Figure 4:
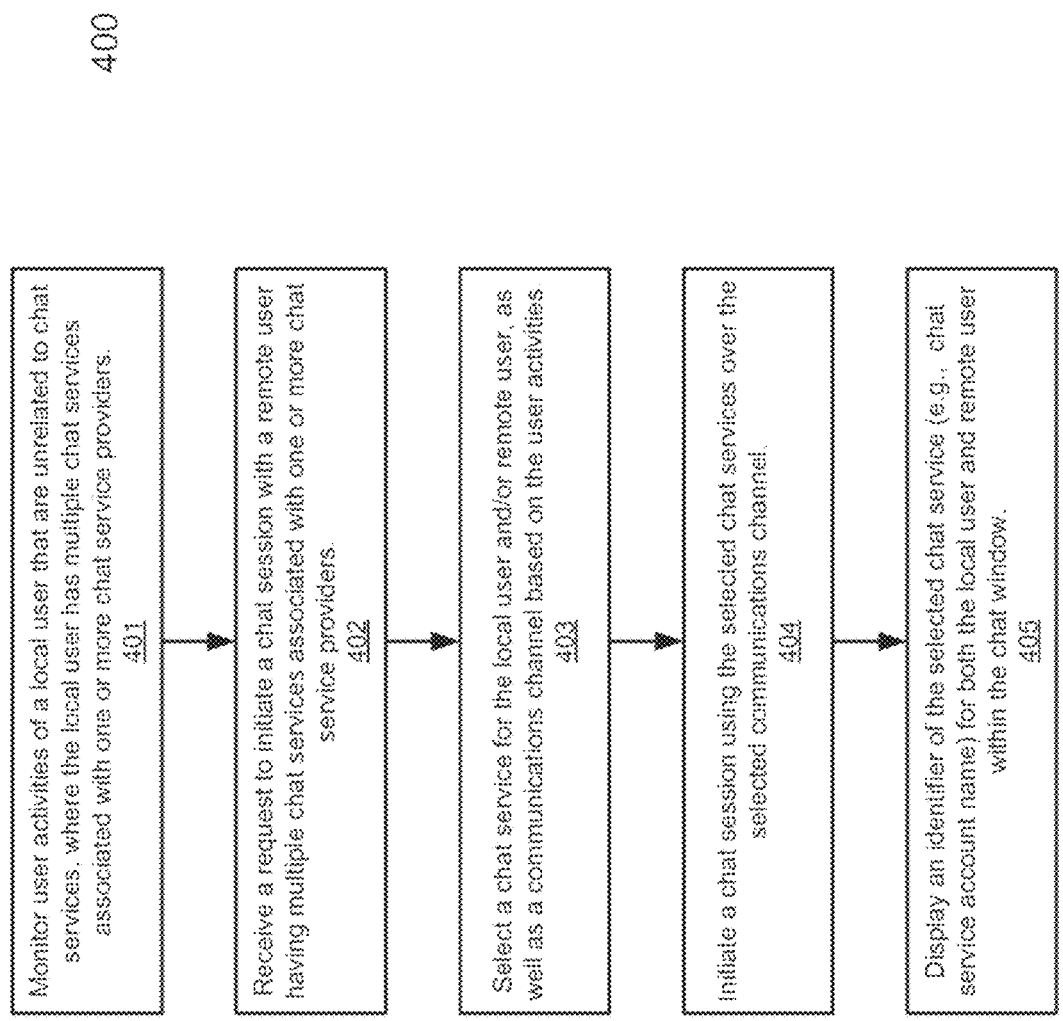
FIG. 4 is a flow diagram illustrating a method for initiating a chat session according to one embodiment of the invention.

FIG. 4 is a flow diagram illustrating a method for initiating a chat session according to one embodiment of the invention. Note that method 400 may be performed by processing logic which may include software, hardware, or a combination of both. For example, method 400 may be performed by chat client 200 of FIG. 2. Referring to FIG. 4, at block 401, user activities are monitored by a chat client for both a local user and a remote user, each having multiple chat services associated with one or more chat service providers. The user activities being monitored are not limited to chat related activities; activities that are unrelated to chat are also monitored. At block 402, a request is received for initiating a chat session with a remote user. In response the request, at block 403, processing logic selects a chat service for the local user and/or for the remote user, as well as a communications channel that is determined the best way to reach the remote user in view of the monitored activities. At block 404, a chat session is initiated using the selected chat services over the selected communication channel. At block 405, the selected chat services and the communication channel are displayed within the chat window. Other operations may also be performed.

Figure 5:
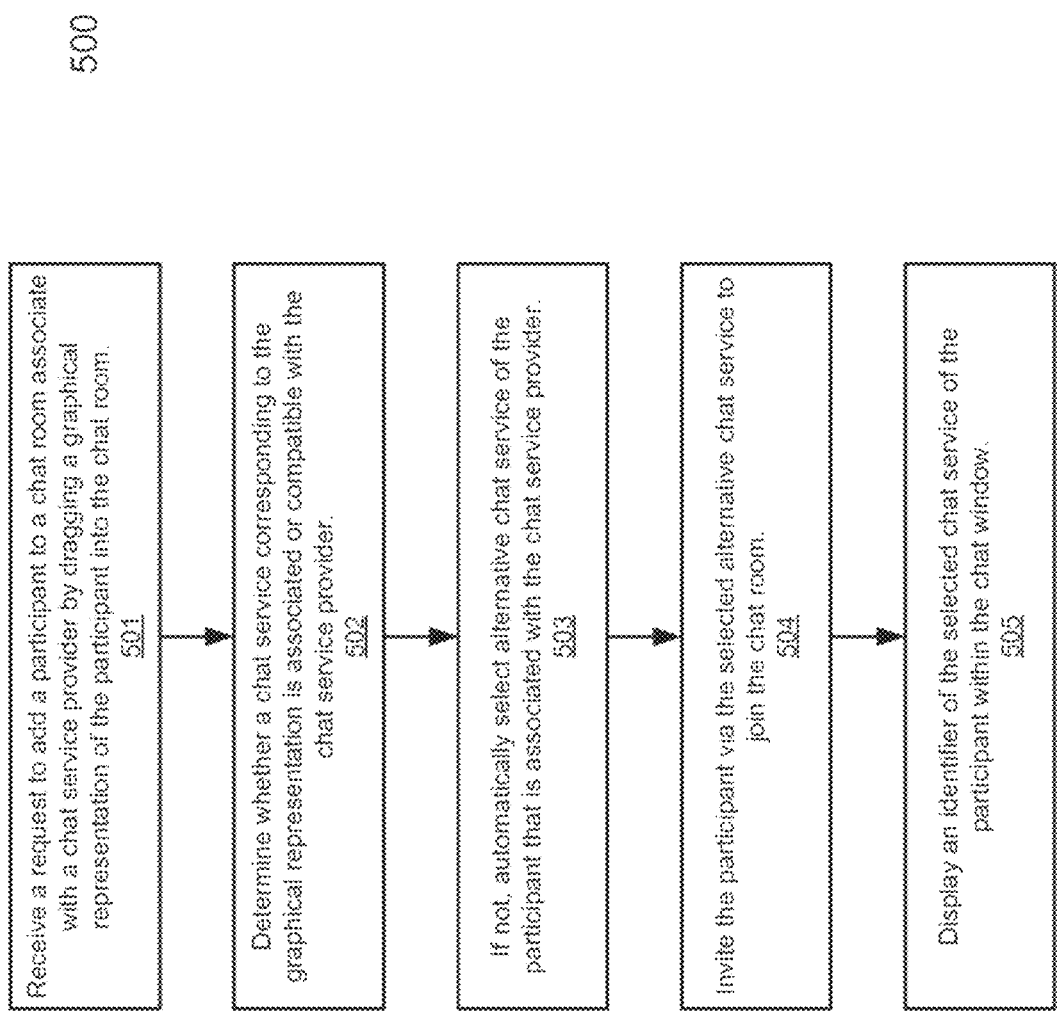
FIG. 5 is a flow diagram illustrating a method for initiating a chat session according to another embodiment of the invention.

FIG. 5 is a flow diagram illustrating a method for initiating a chat session according to one embodiment of the invention. Note that method 500 may be performed by processing logic which may include software, hardware, or a combination of both. For example, method 500 may be performed by chat client 200 of FIG. 2. Referring to FIG. 5, at block 501, a request is received to add a participant to a chat room associated with a chat service provider (e.g., AIM) by dragging a graphical representation such as icon of the participant into the corresponding chat room. For example, a local user may drag an icon representing a chat service associated with the iChat into a current chat room hosted by an AIM chat server.

In response to the request, at block 502, the processing logic determines whether the chat service is associated or compatible with the chat service provider of the current chat room. If not, at block 503, the processing logic automatically selects an alternative chat service of the participant that is compatible with the current chat service provider. In the above example, since the current chat room is hosted by AIM chat service provider and the local user drags an iChat chat service into the current chat room, which is incompatible with the AIM chat room. If the intended participant also has an AIM chat service, the processing logic may automatically select the AIM chat service for the participant. At block 504, the processing logic sends an invitation to the participant via the alternative chat service account (e.g., AIM chat service account in the above example). At block 505, an identifier of the selected chat service account of the participant is displayed within the chat window. Other operations may also be performed.

Figure 6:
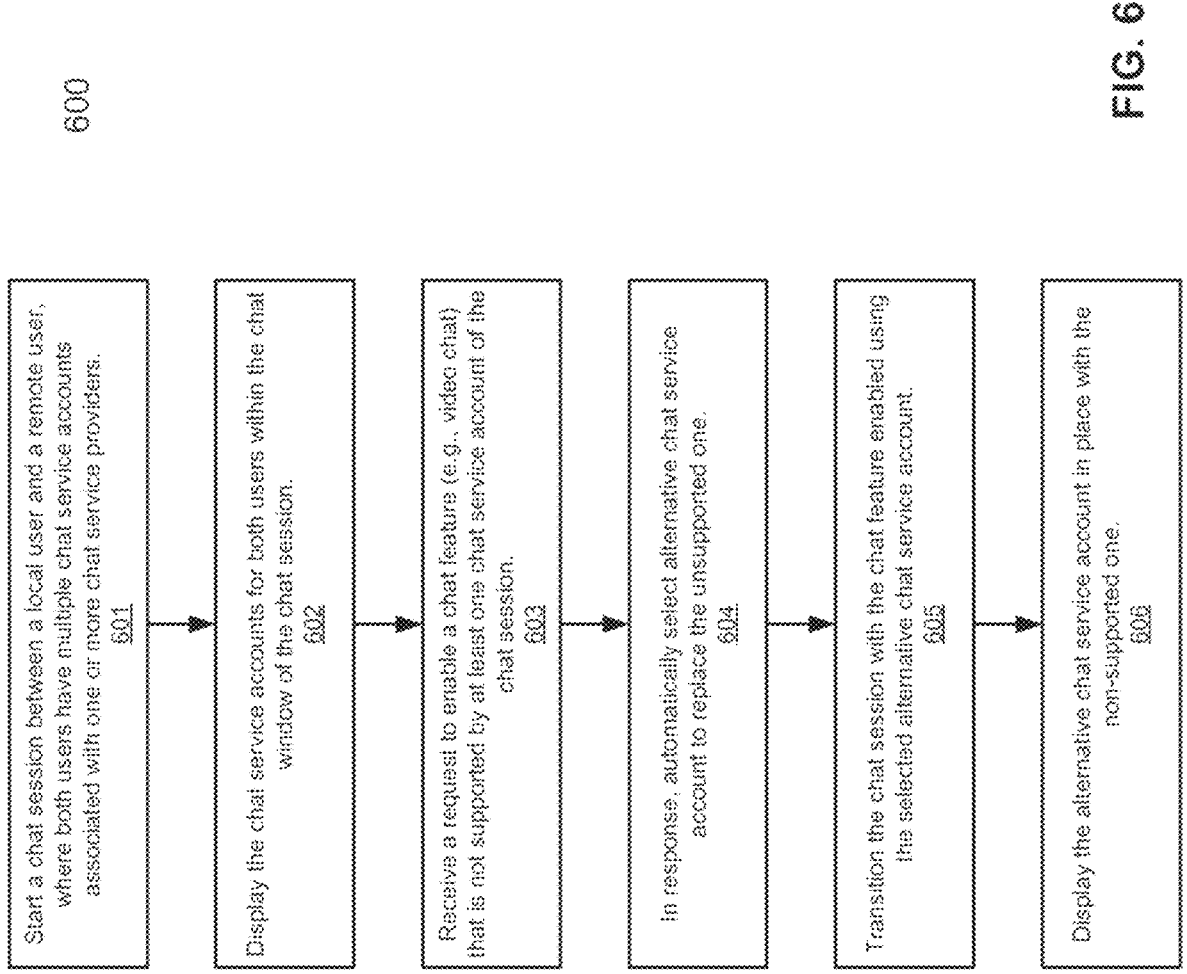
FIG. 6 is a flow diagram illustrating a method for initiating a chat session according to another embodiment of the invention.

FIG. 6 is a flow diagram illustrating a method for initiating a chat session according to one embodiment of the invention. Note that method 600 may be performed by processing logic which may include software, hardware, or a combination of both. For example, method 600 may be performed by chat client 200 of FIG. 2. Referring to FIG. 6, at block 601, a chat session is started between a local user and a remote user. Both the local user and the remote user have multiple chat service accounts associated with one or more chat service providers (e.g., AIM or iChat). At block 602, the chat service accounts selected for the chat session are displayed within the chat window or within the same instance of the chat client. At block 603, a request is received for enabling a chat feature such as a video chat is received, where the chat feature is not supported by at least one of the chat service accounts selected for the current chat session.

In response to the request, at block 604, processing logic automatically selects an alternative chat service account from the corresponding user's list of available chat service accounts to replace the unsupported one. For example, if the remote user's chat service account selected for the current chat session does not support for a video chat, the processing logic may select an alternative chat service account from the remote user's list of service accounts that supports the video chat. The same process is performed for the local user if the local user's current selected chat service account does not support the video chat. At block 605, the current chat session is transitioned to a chat session with the feature enabled using the alternative chat service account or accounts. At block 606, the changes of the chat service accounts are displayed within the chat window or within the same instance of the chat client. Other operations may also be performed.

Figure 7:
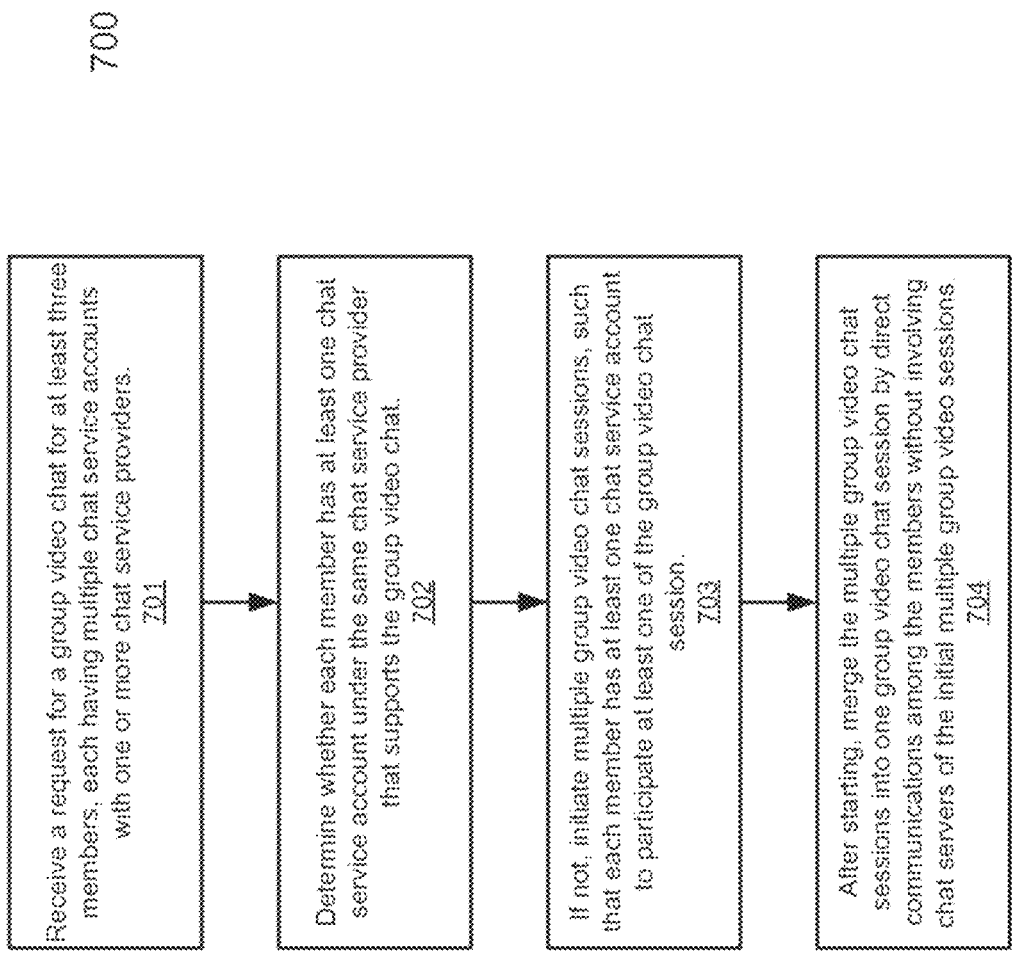
FIG. 7 is a flow diagram illustrating a method for initiating a chat session according to another embodiment of the invention.

FIG. 7 is a flow diagram illustrating a method for initiating a chat session according to one embodiment of the invention. Note that method 700 may be performed by processing logic which may include software, hardware, or a combination of both. For example, method 700 may be performed by chat client 200 of FIG. 2. Referring to FIG. 7, at block 701, a request is received for starting a group video chat session for at least three members, where some of the members have multiple chat service accounts associated with one or more chat service providers. At block 702, processing logic determines whether each member has at least one chat service account under the same chat service provider that supports the group video chat. For example, the processing logic may examine the chat service accounts for all members to determine whether each member has at least one chat service account under AIM. If there is, the processing logic can simply start a group video chat through AIM. Otherwise, at block 703, multiple group video chat sessions may be started such that each member has at least one chat service account to participate at least one of the multiple group video chat sessions. In this example, it is assumed that some of the members have a chat service account under one service provider (e.g., AIM), while other members have a chat service account under another service provider (e.g., iChat). Thus, at least two video chat sessions under AIM and iChat can be started, such that each member can participate at least one of the chat sessions. After the multiple chat sessions started, at block 704, processing logic merges the multiple video chat sessions into one session by directly communicate among the members without involving the corresponding chat servers. Other operations may also be performed.

Figure 8:
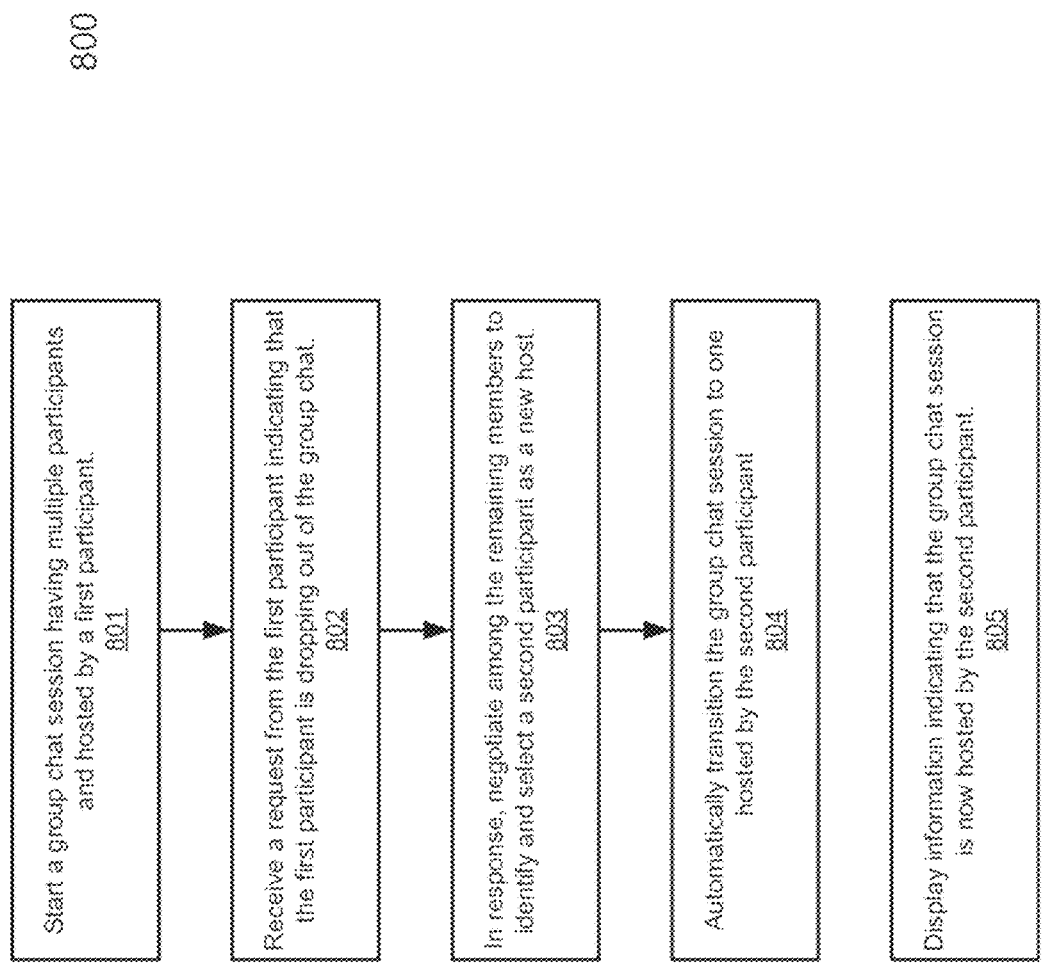
FIG. 8 is a flow diagram illustrating a method for initiating a chat session according to another embodiment of the invention.

FIG. 8 is a flow diagram illustrating a method for initiating a chat session according to one embodiment of the invention. Note that method 800 may be performed by processing logic which may include software, hardware, or a combination of both. For example, method 800 may be performed by chat client 200 of FIG. 2. Referring to FIG. 8, at block 801, a group chat session is started among multiple participants, where the group chat session is hosted by one of the participants as a hosting participant. At block 802, a request is received from the hosting participant indicating that the hosting participant is dropping out of the group chat. In response, at block 803, the processing logic causes a renegotiation to be performed among the remaining participants to identify and select a new hosting participant. At block 804, processing logic automatically transitions the group chat into one hosted by the new hosting participant. At block 805, information regarding changing the host of the group chat session is displayed within the chat window. Other operations may also be performed.

Figure 9:
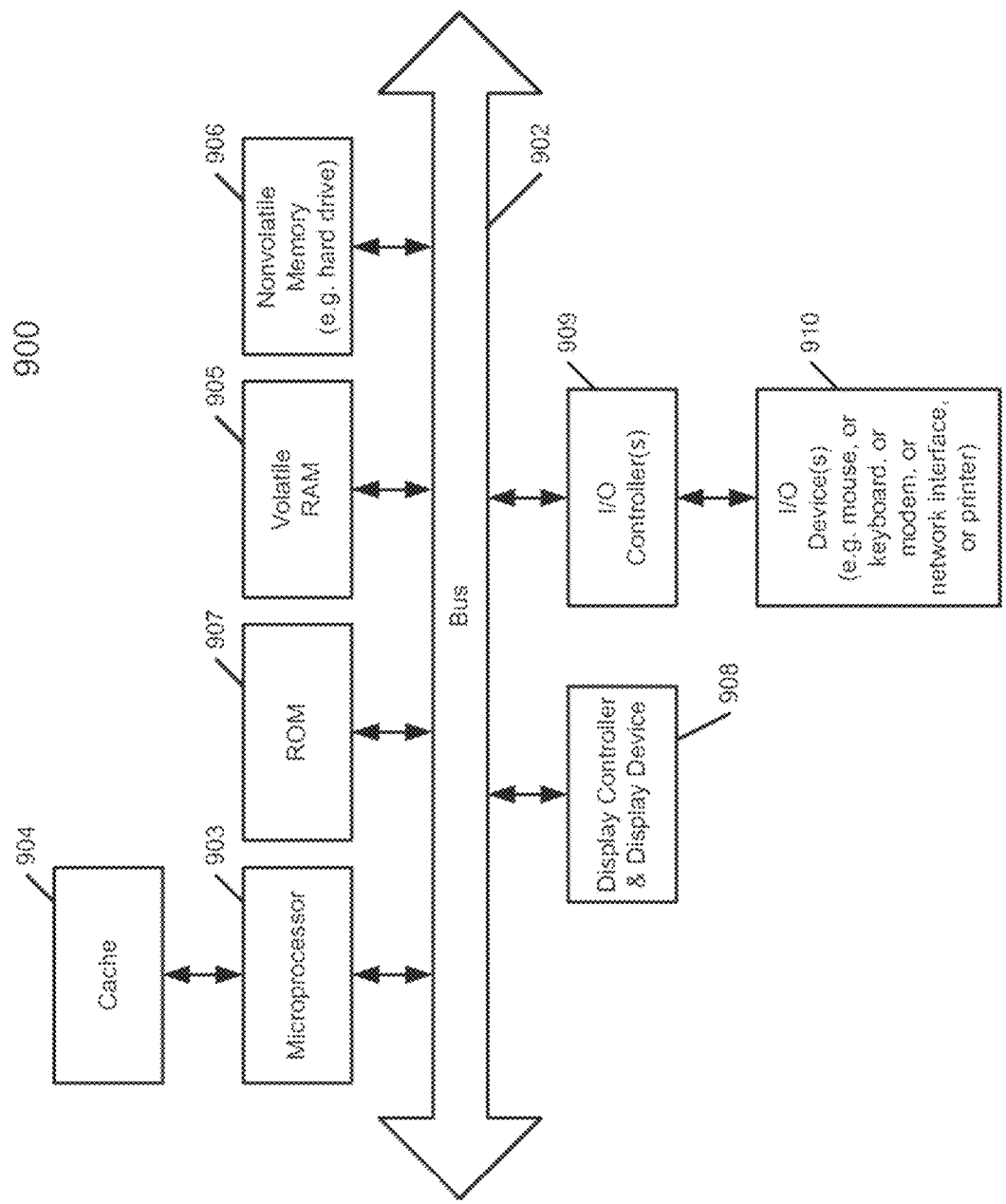
FIG. 9 is a block diagram of a data processing system, which may be used with one embodiment of the invention.

FIG. 9 is a block diagram of a data processing system, which may be used with one embodiment of the invention. For example, the system 900 may be used as a client or server system such as client systems 104-105 and/or chat servers 101-102 of FIG. 1. Note that while FIG. 9 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 9 may, for example, be an Apple Macintosh computer or MacBook, or an IBM compatible PC.

As shown in FIG. 9, the computer system 900, which is a form of a data processing system, includes a bus or interconnect 902 which is coupled to one or more microprocessors 903 and a ROM 907, a volatile RAM 905, and a non-volatile memory 906. The microprocessor 903 is coupled to cache memory 904. The bus 902 interconnects these various components together and also interconnects these components 903, 907, 905, and 906 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 9 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include an IEEE-1394 adapter, also known as FireWire adapter, for controlling FireWire devices.

Method and apparatus for initiating and managing chat sessions have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring", "selecting", "initiating", "displaying", "determining", "sending", "allowing", "transitioning", "enabling", "merging", "receiving", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A tangible, non-transitory, machine-readable medium comprising machine-executable instructions which, when executed by at least one processor of a machine, cause the at least one processor to:
   receive a first request to participate in a group communication session via a first communication service, wherein the group communication session comprises three or more participants;
   in response to the first request, initialize the group communication session via the first communication service, wherein the first communication service comprises a group text-based communication service;
   during the group communication session, receive a second request to participate in the group communication session via a second communication service;
   in response to the second request, determine whether each participant of the three or more participants comprises a respective account associated with the second communication service, wherein a set of participants of the three or more participants consists of participants that each comprise a respective account associated with the second communication service; and
   transition the set of participants of the three or more participants of the group communication session from the first communication service to the second communication service.

2. The machine-readable medium of claim 1, wherein the second communication service comprises a communication feature, wherein the communication feature is not supported by the first communication service.

3. The machine-readable medium of claim 1, wherein the second communication service comprises a voice-based communication service.

4. The machine-readable medium of claim 1, wherein the second communication service comprises a video feature.

5. The machine-readable medium of claim 1, wherein transitioning the group communication session from the first communication service to the second communication service comprises:
   initializing communication via the second communication service; and
   ending communication via the first communication service.

6. The machine-readable medium of claim 1, wherein transitioning from the first communication service to the second communication service comprises transitioning from a first communication protocol to a second communication protocol.

7. The machine-readable medium of claim 6, wherein the first communication protocol is a telephonic communication protocol and the second communication protocol is an Internet communication protocol.

8. The machine-readable medium of claim 1, wherein transitioning from the first communication service to the second communication service comprises transitioning from a first service provider to a second service provider.

9. A method comprising:
   receiving, via a graphic user interface, a first request to participate in a group communication session via a first communication service, wherein the group communication session comprises three or more participants;
   in response to the first request, initializing, via a processor, the group communication session via the first communication service, wherein the first communication service comprises a group text-based communication service;
   during the group communication session, receiving, via the graphic user interface, a second request to participate in the group communication session via a second communication service;
   in response to the second request, determining whether each participant of the three or more participants comprises a respective account associated with the second communication service, wherein a set of participants of the three or more participants consists of participants that each comprise a respective account associated with the second communication service; and
   transitioning, via the processor, the set of participants of the three or more participants of the group communication session from the first communication service to the second communication service.

10. The method of claim 9, wherein the second communication service comprises a communication feature that is not supported by the first communication service.

11. The method of claim 9, wherein the second communication service comprises a voice-based communication service.

12. The method of claim 9, wherein the second communication service comprises a video communication feature.

13. The method of claim 9, wherein transitioning the group communication session from the first communication service to the second communication service comprises:
   initializing communication via the second communication service; and
   ending communication via the first communication service.

14. The method of claim 9, wherein transitioning from the first communication service to the second communication service comprises transitioning from a telephonic communication protocol to an Internet communication protocol.

15. The method of claim 9, wherein transitioning from the first communication service to the second communication service comprises transitioning from a first service provider to a second service provider.

16. An electronic device comprising:
one or more processors;
an electronic display configured to display a graphic user interface; and
a tangible, non-transitory, machine-readable medium comprising machine-readable instructions, which when executed by the one or more processors, cause the electronic device to:
receive, via the graphic user interface, a first request to participate in a group communication session via a first communication service, wherein the group communication session comprises three or more participants;
in response to the first request, initialize, via the one or more processors, the group communication session via the first communication service, wherein the first communication service comprises a group text-based communication service;
during the group communication session, receive, via the graphic user interface, a second request to participate in the group communication session via a second communication service;
in response to the second request, determine whether each participant of the three or more participants comprises a respective account associated with the second communication service, wherein a set of participants of the three or more participants consists of participants that each comprise a respective account associated with the second communication service; and
transition, via the one or more processors, the set of participants of the three or more participants of the group communication session from the first communication service to the second communication service.

17. The electronic device of claim 16, wherein the second communication service comprises a video communication service.

18. The electronic device of claim 16, wherein transitioning from the first communication service to the second communication service comprises transitioning from a first communication protocol to a second communication protocol.

19. The electronic device of claim 16, wherein transitioning from the first communication service to the second communication service comprises transitioning from a first service provider to a second service provider.

20. The electronic device of claim 16, wherein transitioning the group communication session from the first communication service to the second communication service comprises initializing communication via the second communication service before ending communication via the first communication service.

\* \* \* \* \*